(No Model.)
A. F. GILLET.
WAGON AXLE.
No. 496,826. Patented May 2, 1893.
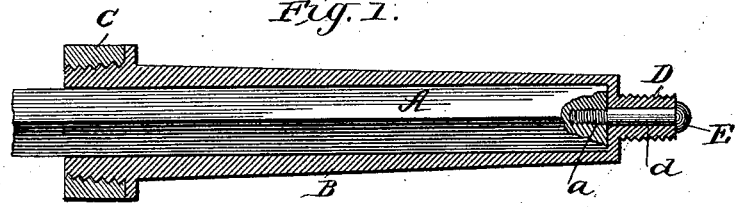
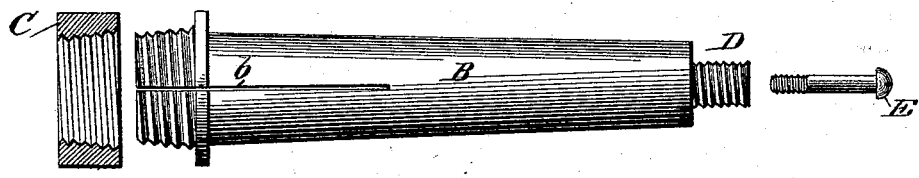
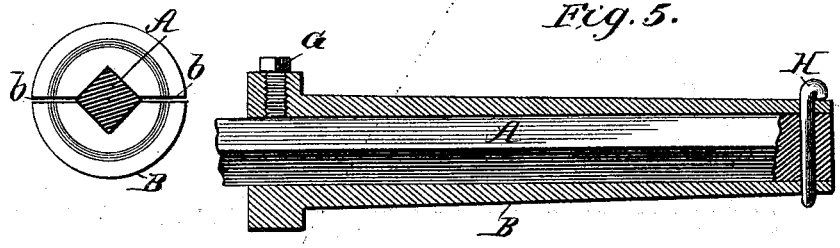
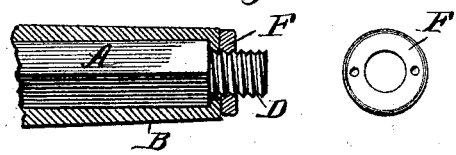
WITNESSES:
Fred G. Dieterich
P. B. Turpin.
INVENTOR
Alexis F. Gillet.
BY Munn & Co
ATTORNEYS.

UNITED STATES PATENT OFFICE.

ALEXIS F. GILLET, OF KEARNEY, NEBRASKA, ASSIGNOR OF TWO-THIRDS TO GEORGE W. WHITEAKER AND JAMES D. WHITEAKER, OF SAME PLACE.

WAGON-AXLE.

SPECIFICATION forming part of Letters Patent No. 496,826, dated May 2, 1893.

Application filed June 18, 1892. Serial No. 437,220. (No model.)

*To all whom it may concern:*

Be it known that I, ALEXIS F. GILLET, of Kearney, in the county of Buffalo and State of Nebraska, have invented a new and useful Improvement in Vehicle-Axles, of which the following is a specification.

My invention is an improvement in axles for use on farm implements, wagons, buggies or other carriages and other wheeled vehicles and the invention has for its object to provide a spindle sleeve for squared or other non-circular axles, and the invention consists in the novel constructions and combinations of parts as will be hereinafter described and pointed out in the claims.

In the drawings—Figure 1 is a side view of an axle provided with my improvements the latter being shown in section. Figs. 2 and 3 are respectively side and inner end views of the sleeve. Fig. 4 is a detail view of the wedging nut and Figs. 5 and 6 show somewhat different constructions from those shown in Figs. 1 and 2.

The axle A which may be of any suitable non-circular shape in cross section is preferably square as shown and is provided in its outer end with a threaded socket $a$ as shown in Fig. 1. The sleeve B is made in the usual spindle form on its outer side and has its interior or bore formed to fit the non-circular axle so the sleeve will be held from turning when fitted thereon. The sleeve is slitted longitudinally at $b$ for a considerable distance from its inner end and has such end tapered and threaded forming a tapered bolt like formation which receives the tapered nut C. When the sleeve is fitted on the axle and the tapered nut C is turned home it will operate to clamp the sleeve firmly to and tighten it upon the axle. By preference the slits $b$ are arranged opposite each other and at the intersection or angle of the walls of the bore of the sleeve as shown in Fig. 3. At its outer end the sleeve is provided with a threaded tenon D to receive the cap nut which serves to retain the wheel on the spindle. This tenon is bored longitudinally at $d$ in line with the socket $a$ to receive the screw E which turns into said socket and operates to secure the sleeve at its outer end to the axle. It will be seen therefore that by the described construction I provide means at both the inner and outer ends of the sleeve for securing the latter to the axle. It will also be seen that the inner fastening device operates to clamp the sleeve in a lateral direction to the axle while the outer fastening secures it in a longitudinal direction. The described construction is preferred for buggies, and similar carriages but it will be understood that, if desired instead of employing the sockets $d$ $a$ and screw E the construction shown in Fig. 6 may be employed. In such construction the tenon is formed on the axle and a nut F is turned on such tenon up against the end of the spindle sleeve.

For use on farm implements and rough work the construction shown in Fig. 5 may be employed. Such construction includes a set screw G turning through the sleeve near its rear end and bearing against the axle and a linch pin H passed through coincident openings in the sleeve and axle as clearly shown in such Fig. 5.

Manifestly the sleeve receives all the wear of the wheel and may be readily and cheaply replaced when worn. It will also be understood that such sleeve may be made of any suitable metal or composition of metal.

Having thus described my invention, what I claim as new, and desire to secure by Letters Patent, is—

1. An axle spindle sleeve having its inner end slitted and provided at such end with a tapered threaded portion substantially as set forth.

2. The combination of the non-circular axle, the spindle sleeve having its inner end slitted and provided at such end with a tapered threaded portion and a tapered nut turned on said portion substantially as set forth.

3. The combination of the non-circular axle, having an end socket $a$ the spindle sleeve fitted on the axle and provided at its outer end with a threaded tenon, having a longitudinal opening $d$ and the screw turning through said opening into the socket $a$ substantially as set forth.

4. The combination of the non-circular axle having an end socket $a$ the spindle sleeve having its inner end slitted and provided with a tapered threaded portion, and having its outer end provided with an opening $d$ the screw turned through said opening into the socket $a$, and the tapered nut turned on the tapered portion of the spindle sleeve all substantially as and for the purposes set forth.

5. The combination of the non-circular axle the spindle sleeve having a non-circular bore and fitted on said axle and fastening devices by which to bind the inner end of the sleeve radially upon the axle substantially as set forth.

6. The combination of the axle the spindle sleeve fitted thereon and having its inner end slitted and devices for compressing the said slitted end of the sleeve upon the axle all substantially as and for the purposes set forth.

ALEXIS F. GILLET.

Witnesses:
P. B. TURPIN,
SOLON C. KEMON.